(12) United States Patent
Stappenbeck et al.

(10) Patent No.: US 12,050,665 B2
(45) Date of Patent: **\*Jul. 30, 2024**

(54) SYSTEMS AND METHODS FOR EXPEDITED ENTITLEMENT CHECKS

(71) Applicant: COMCAST CABLE COMMUNICATIONS MANAGEMENT, LLC, Philadelphia, PA (US)

(72) Inventors: Alfred Joseph Stappenbeck, West Edwards, WA (US); Joseph Lesh, Seattle, WA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/826,726

(22) Filed: May 27, 2022

(65) Prior Publication Data

US 2022/0366016 A1 Nov. 17, 2022

Related U.S. Application Data

(63) Continuation of application No. 17/039,288, filed on Sep. 30, 2020, now Pat. No. 11,372,952, which is a continuation of application No. 15/583,634, filed on May 1, 2017, now Pat. No. 10,839,049, which is a continuation of application No. 14/297,300, filed on Jun. 5, 2014, now Pat. No. 9,692,767.

(51) Int. Cl.
*G06F 21/00* (2013.01)
*G06F 12/14* (2006.01)
*G06F 21/10* (2013.01)
*G06F 21/31* (2013.01)
*H04L 9/40* (2022.01)

(52) U.S. Cl.
CPC ........ *G06F 21/105* (2013.01); *G06F 12/1458* (2013.01); *G06F 21/31* (2013.01); *H04L 63/105* (2013.01); *G06F 21/1077* (2023.08); *H04L 63/102* (2013.01)

(58) Field of Classification Search
None
See application file for complete search history.

(56) References Cited

U.S. PATENT DOCUMENTS

| | | | |
|---|---|---|---|
| 7,555,464 B2 | 6/2009 | Candelore | |
| 7,698,225 B2 | 4/2010 | Rhodes et al. | |
| 7,797,678 B2 | 9/2010 | Moulckers et al. | |
| 8,041,642 B2 | 10/2011 | Lenard et al. | |
| 8,386,465 B2 * | 2/2013 | Ansari | H04L 47/83 707/713 |
| 9,692,767 B2 | 6/2017 | Stappenbeck, Jr. et al. | |

(Continued)

*Primary Examiner* — Andrew J Steinle
(74) *Attorney, Agent, or Firm* — Ballard Spahr LLP

(57) ABSTRACT

Systems and methods for managing access data are disclosed. One method can comprise receiving prediction information relating to one or more content options and requesting access information associated with the prediction information. At least a portion of the received access information can be processed to provide a preliminary access decision. A request for access relating to the one or more data options can be received and an access decision based at least in part on the preliminary access decision can be provided.

32 Claims, 10 Drawing Sheets

(56) References Cited

U.S. PATENT DOCUMENTS

| | | |
|---|---|---|
| 2006/0080729 A1 | 4/2006 | Koh et al. |
| 2008/0228578 A1* | 9/2008 | Mashinsky ........ G06Q 30/0267 |
| | | 709/224 |
| 2008/0243699 A1 | 10/2008 | Hilerio et al. |
| 2008/0306786 A1 | 12/2008 | Lonowski et al. |
| 2009/0124374 A1 | 5/2009 | Patel |
| 2009/0265772 A1 | 10/2009 | Hitchcock et al. |
| 2011/0067095 A1 | 3/2011 | Leicher et al. |
| 2012/0089996 A1* | 4/2012 | Ramer ................... H04H 60/46 |
| | | 725/14 |
| 2012/0174145 A1 | 7/2012 | Frazier et al. |
| 2012/0227115 A1 | 9/2012 | Kidron |
| 2015/0033307 A1 | 1/2015 | Ishikura |
| 2015/0358330 A1 | 12/2015 | Stappenbeck et al. |
| 2018/0295203 A1 | 10/2018 | Wilde |
| 2020/0301591 A1 | 9/2020 | Shinnaka |

\* cited by examiner

SYSTEMS AND METHODS FOR EXPEDITED ENTITLEMENT CHECKS

CROSS REFERENCE TO RELATED PATENT APPLICATION

This application is a continuation of U.S. patent application Ser. No. 17/039,288 filed Sep. 30, 2020, which is a continuation of U.S. patent application Ser. No. 15/583,634 filed May 1, 2017, and issued as U.S. Pat. No. 10,839,049 on Nov. 17, 2020, which is a continuation of U.S. patent application Ser. No. 14/297,300 filed Jun. 5, 2014, and issued as U.S. Pat. No. 9,692,767 on Jun. 27, 2017, which are herein incorporated by reference in their entireties.

BACKGROUND

Content can be provided to a user though many different devices. Content providers, publishers, and device manufacturers often rely on digital rights management (DRM) and other access control technologies to manage access to content and devices. A DRM license, for example, is evaluated after a request for content is received and before viewing of the content can commence. Accordingly, the user requesting the content must wait for a response to a rights management inquiry before viewing content. Wait time may be affected by several factors, including data retrieval and validation, that facilitate the granting of a license to the appropriate user. Such delays, however, can frustrate the user experience. These and other shortcomings are identified and addressed by the disclosure.

SUMMARY

It is to be understood that both the following general description and the following detailed description are exemplary and explanatory only and are not restrictive. Provided are methods and systems for processing content rights and/or entitlement checks. The systems and methods of the present disclosure can be used to authenticate a user's right to consume content provided to a user via one or more networks or devices. The systems and methods of the present disclosure can be used to control access to and delivery of particular content, e.g., content that is provided to a particular device and/or user. In an aspect, systems and methods of the present disclosure can be used to predictively process information to determine whether a user or device can access particular content or services. Such information can be used to minimize processing time when a request for access is actually received.

In an aspect, a method can comprise receiving prediction information relating to one or more content options and requesting access information associated with the content options related to the prediction information. Access information can be received in response to the request for access information. At least a portion of the received access information can be processed to provide a preliminary access decision. A request for access relating to the one or more content options can be received, and an access decision based at least in part on the preliminary access decision can be provided.

In another aspect, a method can comprise receiving a request for access to content and determining if first access information is stored in a cached storage medium. If the first access information is stored in the cached storage medium, the first access information can be retrieved from the cached storage medium. If the first access information is not stored in the cached storage medium, second access information can be retrieved from another, e.g., remote, storage device. An access decision can be provided based on one or more of the first access information and the second access information.

In yet another aspect, a method can comprise providing prediction information relating to a plurality of content options available or presented to a user, wherein the prediction information facilitates pre-determining at least a portion of access information into storage. A selection of one or more content options of the plurality of content options can be received. A request for access can be provided based on the selection of one or more content options. An access decision can be received in response to the request for access and based, at least in part, on the at least a portion of the access information.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
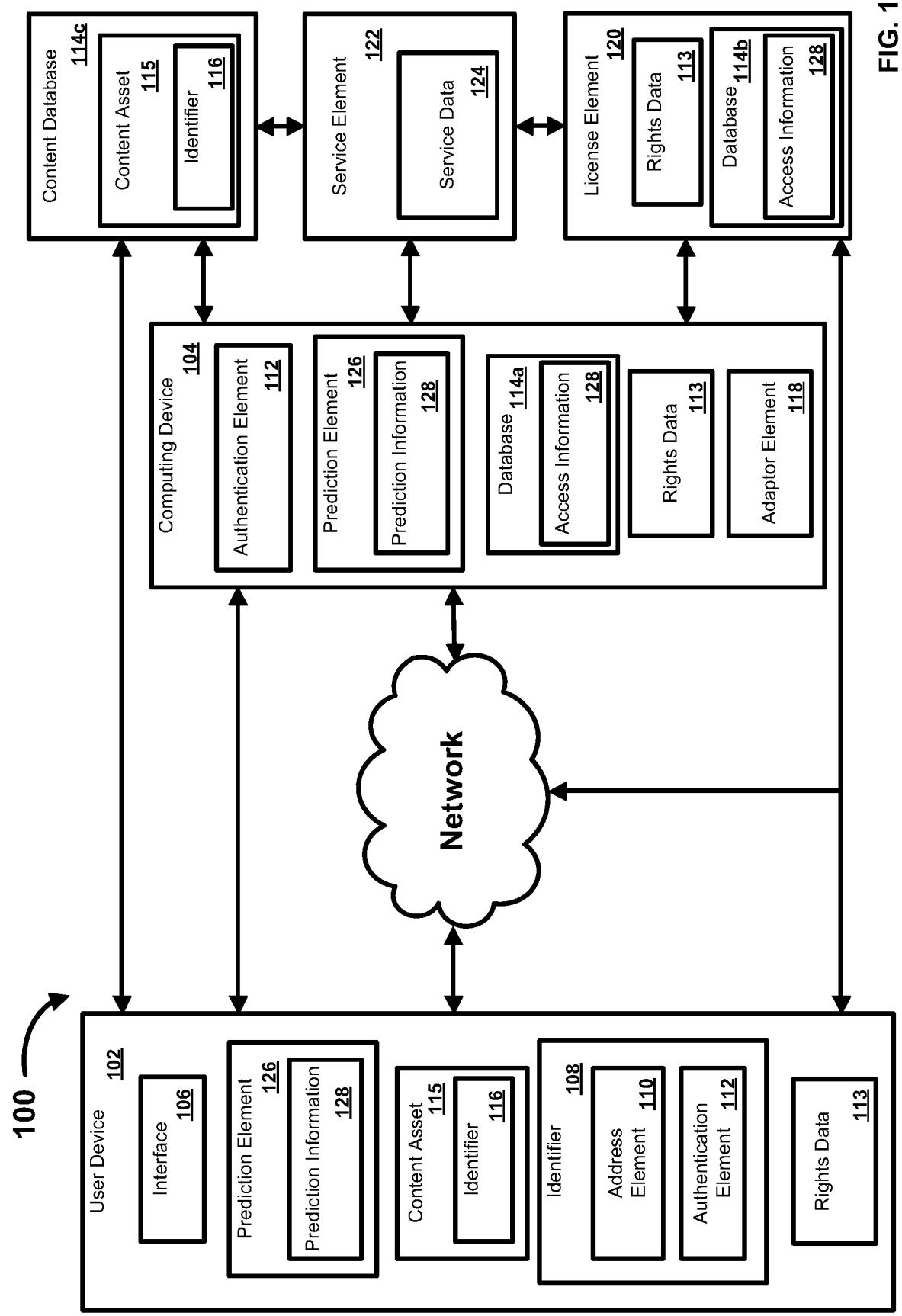
FIG. 1 is a block diagram of an example system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, the systems and methods of the present disclosure can be used to authenticate a user's right to consume content provided to a user via one or more devices. The systems and methods of the present disclosure can be used to control particular content provided to a particular device and/or user. The systems and methods of the present disclosure can be used to predictively process information to determine whether a user or device has the requisite rights to access content. As an example, when a user is provided a plurality of option items from which the user can select for processing, prediction information relating to the plurality of option items can be processed before a selection is made. Once a selection is made, a request for access relating to the selected option item can be received. The request can be processed and fulfilled based upon at least the pre-processed prediction information. Such predictive pre-processing can minimize the wait time experienced by a user when making selections of the one or more option items.

In an aspect, FIG. 1 illustrates various aspects of an exemplary system and network in which the present methods and systems can operate. The present disclosure relates to systems and methods for managing data. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system and network 100 can comprise a user device 102 in communication with a computing device 104, such as a server, for example. The computing device 104 can be disposed locally or remotely relative to the user device 102. As an example, the user device 102 and the computing device 104 can be in communication via a private or public network, such as the Internet. Other forms of communication can be used, such as wired and wireless telecommunication channels, for example.

In an aspect, the user device 102 can be an electronic device, such as a computer, a smartphone, a laptop, a tablet, a set top box, or other device capable of communicating with the computing device 104. As an example, the user device 102 can comprise an interface 106 for providing an interface to a user to interact with the user device 102 and/or the computing device 104. The interface 106 can be any interface for presenting information to the user and receiving a user feedback, such as a web interface (e.g., Internet Explorer, Mozilla Firefox, Google Chrome, Safari, or the like). Other software, hardware, and/or interfaces can be used to provide communication between the user and one or more of the user device 102 and the computing device 104.

As an example, the interface 106 can request or query various files from a local source and/or a remote source.

As an example, the interface 106 can facilitate interaction between a user and one or more of the user device 102 and/or the computing device 104. As a further example, the interface 106 can provide feedback to the user. In an aspect, the interface 106 can receive an input, allowing the users to manipulate control functions associated with one or more of the user device 102 and/or the computing device 104. As an example, the interface 106 can provide an output, allowing one or more of the user device 102 and/or the computing device 104 to indicate the effects of the received input. As a further example, the interface 106 can present content, such as program guide listings, content options, and related information.

In an aspect, the interface 106 can obtain program guide listings from an electronic program listing database and display the program guide listings. The interface 106 can display program guide information for programs that are available for viewing on the mobile terminal at that time. The interface 106 can display program guide information listings for multiple programs one after another and may display each program guide listing for a predetermined time range. A user may specify and store personal interest rules for the interface 106 to alert the user when the interface 106 is displaying information for a certain program, or for a certain genre of program.

An interface such as interface 106 can provide interface elements (e.g., icons, selectable items, option items, graphical representations, etc.). In an aspect, before a user makes a deliberate selection in an interface, for example, to initiate playback of protected media, information can be transmitted (e.g., asynchronously) to a computing device associated with a license issuance service. For example, information related to a content item can be transmitted when the user hovers over, or highlight with a user device such as a remote control, but before actually selecting the content item.

As an example, the transmitted information can relate to a prediction of what the user could possibly select. In an aspect, the prediction can be based on viewing history associated with a user and/or a user device. For example, the user viewing history can comprise types of top viewed content items and associated viewing time. In another aspect, the prediction can be based on account information such as location, language preference, gender, language preference, and the like associated with a user. As a further example, information (e.g., prediction information) relating to the content options provided via the interface can be transmitted to a computing device for preemptive processing. Such preemptive processing can comprise the preemptive data retrieval of one or more of: account information, user metadata (e.g., billing status, subscriptions, billing location, third-party partner information, single sign-on (SSO) identifiers, etc.), media metadata (e.g., MPAA-Ratings, protection scheme, expiration date, available date, subscription package relationships, etc.), purchased rentals of media title(s) in question, single purchased ownership of media title(s) in question, purchased season ownership (e.g., all episodes of a content series or season), subscription package definitions related to the user's subscriptions (e.g., pay services, specialized services), evaluations of subscription package definitions against media metadata, (e.g., does the user's subscription definition evaluate positive or negative to the requested data option), locations of dependent services for this user/media account (e.g., media data service, device data service, secure key data service, subscription data service, etc.), security keys necessary to issue a relevant DRM license, device details (e.g., security keys for specific hardware, DRM-individualization keys, limits on the number of active devices), local blackout information (e.g., sports games blacked out for current location), and external third party metadata for media.

Such preemptive processing can comprise a determination of a preliminary access decision based on one or more of the prediction information and the preemptively retrieved information. The preliminary access decision can be stored (e.g., in a service-side cache). Once the user selects an interface element, the preliminary decision can be accessed to facilitate an access decision for the selected interface element. For example, a plurality of content items can be presented to a user via an interface. Information relating to the plurality of content items can be transmitted to an access decision provider (e.g., license element, computing device associated with license decisions, service provider, etc.) for preemptive processing. When the user scrolls through the content items presented via the interface, other content items can be newly presented to the user via the interface. As such, information relating to the other content items can be transmitted to the access decision provider for preemptive processing. Such preemptive processing can be used to generate a preliminary access decision for one or more of the content items presented to the user before the user actually selects one of the content items. Once the user selects one of the presented content items, a request for access associated with the selected content item can be transmitted to the access decision provider for processing. Instead of having to process the request from scratch, the preliminary access decision can be accessed or retrieved. The preliminary access decision can be used as the basis for a final access decision, which will be a determination of whether the user can access the selected content item. The preemptive processing and use of the preliminary access decision can reduce user wait times between the selection of the content item and the receipt of the final access decision.

In an aspect, the transmission of prediction information can be implemented via an API, such as an HTTP method (HEAD/POST/GET):

```
http://fqdn/path/Service/!MightAskFor?
userid=<user-token>&
mecliald\[0\]=<meclia-id>&
mecliald\[1 \] =<another-meclia-id>&
mecliaid\IN\J=<even-more-meclia>&
protectionScheme=MSPlayReady&
additionalUserinfo=<map-of-addition-user-information>
```

The above example HEAD scenario has no response and none is expected. As an example, a 200 status code would mean simply that the receipt of prediction information is acknowledged.

In the POST/GET case, a payload could be returned describing both positive and negative results for as many media as were described in the prediction information. An example of a negative result for media might be that it wasn't available for another ten minutes. A positive response for media might be the acknowledgment that information is cached and prepared for final selection.

A response in JSON format for two content items (e.g., item1 and item2) can be similar to the following:

```
[{
  "mediaid": item1,
  "error": "Release is not yet available for this user"
},
{
  "mediaId":item2,
  "result":"Prepared for selection"
}]
```

A user device such as device 102 can be configured to present a highlighted element if the selection response is deemed useful. For example, for mediaID item1, which is not available (e.g., a preliminary access decision is negative), the interface can gray out the interface element associated with the item1 until item1 becomes available for final selection.

In an aspect, the user device 102 can comprise an identifier 108, which, among other things, can be used to: authenticate the user device 102 with a particular network; install drivers; configure a modem; set up a wired or wireless Local Area Network (LAN); secure an operating system; configure browser provider-specifics; provision electronic mail (e.g., create mailboxes and aliases); configure electronic communications; install additional support software; install add-on packages; and the like. As an example, the identifier 108 can comprise one or more address elements 110 and authentication elements 112.

In an aspect, the address element 110 can be a uniform resource identifier (URI) (e.g., a uniform resource locator (URL)), a network address, an Internet address, or the like. As an example, the address element 110 can be relied upon to establish a communication session between the user device 102 and the computing device 104. As a further example, the address element 110 can be any identifier used to distinguish the user device 102 from other devices intercommunicating with the computing device.

In an aspect, the authentication element 112 can be credentials, a token, a character, a string, or the like, for differentiating one user or user device from another user or user device. In an aspect, the authentication element 112 can comprise information for authenticating the user and/or user device 102 with the computing device 104 to facilitate access to data and/or services. As an example, the computing device 104 can be configured to receive and validate the authentication element 112 to facilitate a secure communication between the user device 102 and one or more of the computing devices, such as computing device 104.

In an aspect, rights data 113 can be associated with one or more users and/or user devices 102. In another aspect, the rights data 113 can comprise information relating to the permissions and/or entitlements associated with a particular user and/or device. As an example, the rights data 113 can comprise information, such as subscription information, identification information, location information, and/or timing information relating to a particular user or user device. In an aspect, one or more databases 114a, 114b, 114c can store information, such as rights data 113, relating to users, user preferences, and user devices and configurations. In another aspect, the rights data 113 can be associated with one or more content assets 115 and/or a source of the content assets. The rights data 113 can have time stamps or markers associated therewith.

In an aspect, the computing device 104 can be configured as a license server, an access control system, software as a service, a computing device functioning as a license generation/decision service, and/or an access rights authentication device, and the like. As an example, licenses can be generated to communicate permissions and rights in a particular format (e.g., Adobe® Flash® Access™, Microsoft® Windows Media® DRM, Widevine, Microsoft PlayReady®, etc.). As a further example, generating a license for any specific technology can comprise matching third party libraries with technology dependency requirements, data expression requirements, operating system architecture requirements, idioms of implementation, and the like. In an aspect, one or more computing devices 104 can be implemented for a particular technology or operating format. As an example, each technology can implement a distinct computing device 104. As a further example, the user device 102 can communicate with the computing device 104 to request and/or receive a content license.

In an aspect, the computing device 104 can be configured to determine access rights or entitlement for a particular user and/or device. In another aspect, a user and/or device can have certain access rights (e.g., user rights) associated with the content that the particular user and/or device can consume. As an example, a user may have the rights to store certain programming on a digital recorder, storage medium, buffer, or the like. As a further example, a user may have rights to consume particular content or programming. In an aspect, the computing device 104 can determine whether a particular user and/or device has appropriate rights to consume certain content.

In an aspect, the computing device 104 can be a server for communicating with the user device 102. As an example, the computing device 104 can manage and/or monitor the intercommunication between the user device 102 and one or more databases 114a, 114b, 114c for sending and receiving data therebetween. In an aspect, the databases 114a, 114b, 114c can store a plurality of information sets (e.g. data sets, files, web pages, content assets, etc.). As an example, the user device 102 can request an information set from the databases 114a, 114b, 114c. As a further example, the user device 102 can retrieve one or more information sets from the databases 114a, 114b, 114c.

In an aspect, one or more databases can be configured as a content database 114c. The content database 114c can store one or more content assets 115. As an example, one or more content assets 115 can comprise one or more of audio content, video content, news, sports programming, advertisements, and the like. As an example, the content database 114c can be configured to transmit data (e.g., content assets 115) to various end-users. In another aspect, one or more identifiers 116 can be associated with one or more content assets 115. As an example, each content asset 115 can be associated with a unique identifier. As a further example, the identifier 116 can be or comprise a token, a character, a string, or the like, for differentiating one content asset 115 from another content asset 115.

In an aspect, the user device 102 can receive one or more content assets 115. As an example, the user device 102 can be authenticated (e.g., via the authentication element 112) prior to receiving one or more content assets 115. As a further example, the user device 102 can request authentication via the computing device 104 or the like.

In an aspect, the user device 102 can request entitlement (e.g., a license, rights confirmation, etc.) to consume (e.g., view, store, transfer, record, manipulate, etc.) the received content asset 115. As an example, rights data 113 associated with one or more of a user, the user device 102, and the received content asset 115 can be analyzed to determine entitlement. As a further example, the user device 102 can request entitlement via the computing device 104 and/or a device (e.g., license element 120, service element 122) configured to evaluate entitlements.

In an aspect, an adaptor element 118 can be configured to facilitate interaction between a first device (e.g., user device 102, computing device 104) or element (e.g., software) and a second device or element (e.g., license element 120, service element 122). As an example, the adaptor element 118 can be associated with the computing device 104 to facilitate analysis and/or fulfillment of entitlement requests. As a further example, one or more adapter elements 118 can be selected based on characteristics associated with the entitlement request. Characteristics can comprise a user identifier, device identifier 108, rights data 113, content asset characteristics, content asset identifier 115, or the like. In an aspect, an entitlement request can comprise a user identifier, a content asset identifier, and rights data 113. A first one of the adapter elements 118 can be selected to interact with user specific services or devices based upon the user identifier. As an example, the first one of the adaptor elements 118 can be configured to retrieve metadata relating to the user from a system (e.g., user-related data service, user profile service, billing system) external to the computing device 104. A second one of the adapter elements 118 can be selected to interact with content specific services or devices based upon the content asset identifier. As an example, the second one of the adaptor elements 118 can be configured to retrieve metadata relating to the content asset user from a system (e.g., content provider, media service) external to the computing device 104.

In an aspect, the license element 120 can be in communication with one or more computing devices, such as computing device 104 and/or user device 102, to determine access rights or entitlement for a particular user, data (e.g., content) and/or device. As an example, the license element 120 can be configured as an access control system, software as a service, a computing device functioning as a license decision service, and/or an access rights authentication device. In an aspect, a user and/or device can have certain access rights associated with the content that the particular user and/or device can consume. As an example, a user may have the rights to store certain programming on a digital recorder, storage medium, buffer, or the like. As a further example, a user may have rights to consume particular content or programming. In an aspect, the license element 120 can determine whether a particular user and/or device has appropriate rights to consume certain content. As an example, the license element 120 can communicate a determination (e.g., a decision) of entitlement to one or more computing devices, such as computing device 104 and/or use device 102.

The license element 120 can be an access control system, software as a service, a computing device functioning as a license generation service, and/or an access rights authentication device, and the like. As an example, licenses can be generated to communicate permissions and rights in a particular format (e.g., Adobe® Flash® Access®, Microsoft® Windows Media® DRM, Widevine, Microsoft PlayReady®, etc.). As a further example, generating a license for any specific technology can comprise matching third party libraries with the technology dependency requirements, data expression requirements, operating system architecture requirements, idioms of implementation, and the like.

In an aspect, the license element 120 can be configured to determine entitlements based upon information relating to a user, such as an identifier and/or rights data 113. As an example, the license element 120 can validate user rights by comparing user information (e.g., metadata relating to the user, metadata of the entitlement request, etc.) to rights data 113 to determine if a user requesting data and or services has the appropriate user rights to receive and/or consume the data or services. As another example, the license element 120 can request user validation from another device, such as the computing device 104. As a further example, one or more adaptor elements 118 can facilitate the user validation between the license element 120 and the computing device 104.

In an aspect, the service element 122 can be configured to determine entitlements based upon information (e.g., a content identifier and/or service data 124) relating to a service (e.g., content delivery). As an example, the service element 122 can validate entitlements by comparing service data 124 (e.g., metadata relating to services, metadata relating to the content, metadata of the entitlement request, etc.) to rights data 113 to determine if a requested data and or service can be provided. As another example, the service element 122 can request user validation from another device, such as the computing device 104. As a further example, one or more adaptor elements 118 can facilitate the user validation between the service element 122 and the computing device 104.

Figure 2:
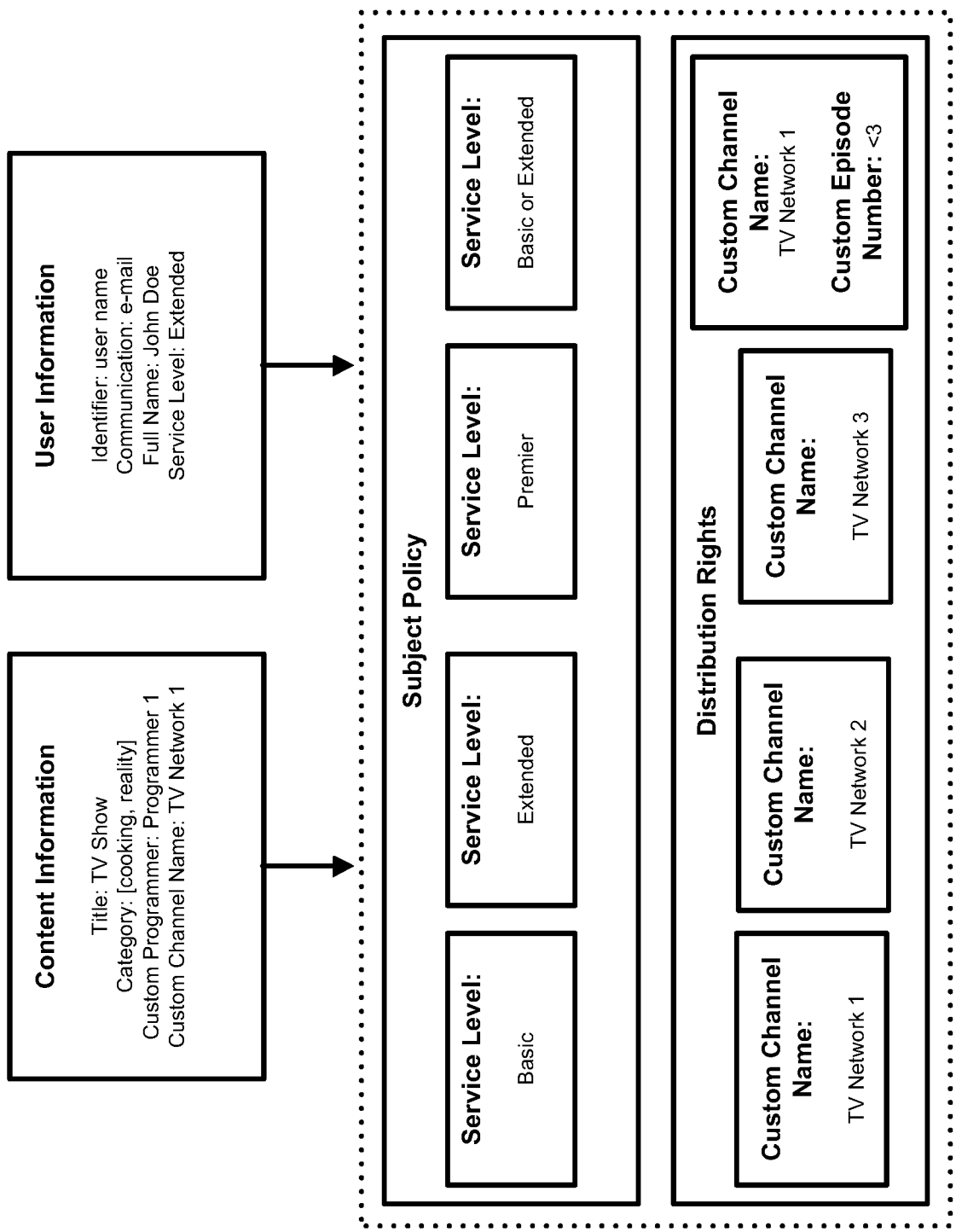
FIG. 2 is a block diagram of example entitlement information.

As illustrated in FIG. 2, one or more license decisions can be determined based on informational components, such as content information, user information, and a rights package (e.g., rights data 113 (FIG. 1)) such as subject policy (e.g., subscriber group policy) and/or distribution rights (e.g., subscription package information). Two or more of the information components can be interrelated. For example, a subject policy can be dependent on user information. As another example, distribution rights can be dependent on the subject policy and/or content information. As a further example, license decisions can be based upon an analysis of a rights package (e.g., a grouping of rights data, subject policies, distribution rights, etc.) comprising information relating to the permissions and/or entitlements associated with a particular user and/or device. As an example, the rights package can comprise information, such as subscription information, identification information, location information, and/or timing information relating to a particular user or user device. In an aspect, a rights package can be device specific. In another aspect, a rights package can be user specific, allowing one or more users to request content via the same device, while license decisions are based upon the user. For example, a parent may have a first rights package associated with a device, while a child may have a second rights package with different entitlements than the first rights package.

In an aspect, content information can comprise information relating to one or more content assets. As an example, content information can comprise information such as title, category, type, genre, provider, programmer, channel name, channel type, etc. Other information can be provided relating to one or more content assets, such as duration, version, quality, etc.

In an aspect, user information can comprise information relating to one or more users or devices. As an example, user information can comprise information such as an identifier, communication type, name, service level, address, billing information, user rights, user history, and the like.

In an aspect, subject policy information can comprise information relating to one or more services, policies, subscription packages, service levels, etc. As an example, the subject policy information can comprise information such as one or more of a basic service level, extended service level, and premier service level. As a further example, the subject policy information can be compared to one or more of the content information and the user information to determine whether a user has permission to access a particular content asset.

In an aspect, distribution rights can comprise information relating to one or more user rights, permissions, entitlements, and the like. As an example, the distribution rights can comprise information relating to user permissions for one or more content assets, content channels, content episodes, versions, etc.

Figure 3:
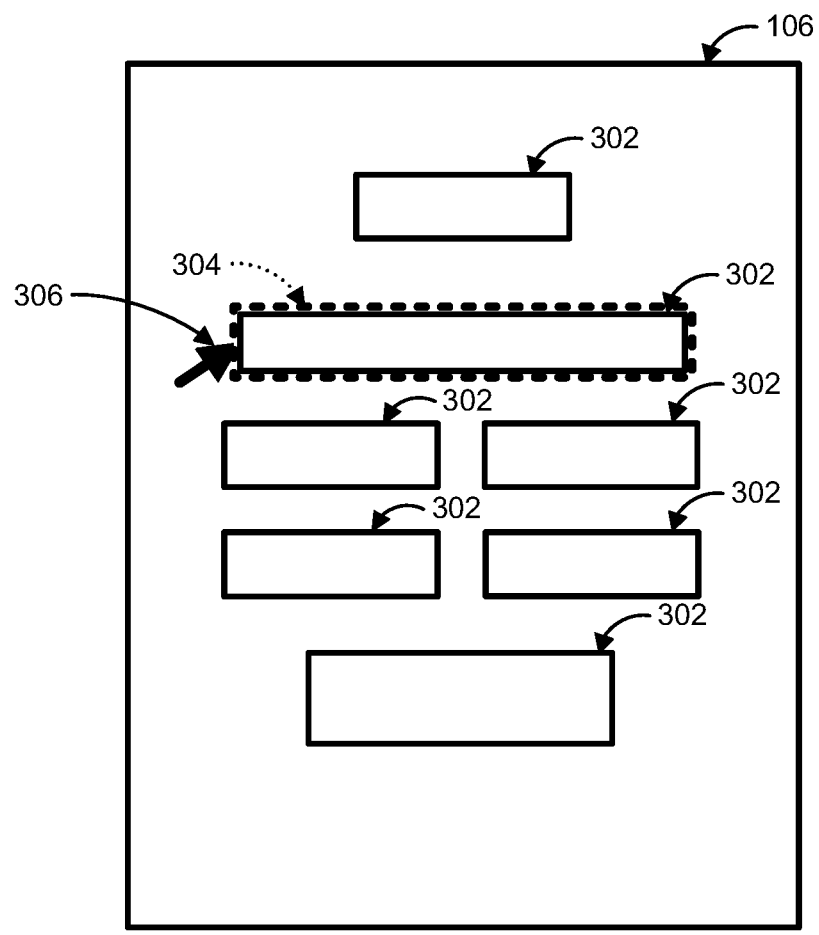
FIG. 3 is a representation of a user interface.

FIG. 3 illustrates an exemplary representation of the interface 106 having a plurality of selectable elements 302. In an aspect, a selection indicator 304, such as a highlight, colorization, or other graphic (e.g., icon) can be used to identify to a viewer the selectable element that is currently selected or positioned for selection. The selection indicator 304 can also be implemented to illustrate whether a preliminary access decision has been granted for a particular selectable element 302. In an aspect, a navigation indicator 306 or cursor can be presented to provide feedback to a user and/or viewer. In another aspect, when the plurality of selectable elements 302 are presented to a user, information (e.g., prediction information) relating to the presented selectable elements 302 can be transmitted and/or processed. Such information can comprise metadata relating to an item (e.g., content) or service associated with one or more of the selectable elements.

As an example, the transmitted information can relate to a prediction of what the user could possibly select. In an aspect prediction can be based on user viewing history, device viewing history, household viewing history, and the like. For example, if no movie has ever been requested from a particular channel, then the system can avoid pre-processing movie selections from that channel. Conversely, if movies of a certain type are frequently consumed, then the system can pre-process some or all movies of that type. Such processing can be based, for example, on movie type, channel, actor, and the like.

As a further example, information (e.g., prediction information) relating to the options provided via the interface can be transmitted to a computing device for preemptive processing. Such pre-emptive processing can comprise the preemptive data retrieval of access information (e.g., user information, billing status, package-channel assignment) as well as media metadata (e.g., available dates, subscription policy, etc.). Such preemptive processing can comprise a determination of a preliminary access decision based on one or more of the prediction information and the preemptively retrieved information. The preliminary access decision can be stored (e.g., in a service-side cache).

Once the user selects an interface element, the preliminary decision can be accessed to facilitate an access decision for the selected interface element. For example, a plurality of content items can be presented to a user via an interface. Information relating to the plurality of content items can be transmitted to an access decision provider (e.g., license element, computing device associated with license decisions, service provider, etc.) for preemptive processing. When the user scrolls through the content items presented via the interface, other content items can be newly presented to the user via the interface. As such, information relating to the other content items can be transmitted to the access decision provider for preemptive processing. Such preemptive processing can be used to generate a preliminary access decision for one or more of the content items presented to the user and before the user actually selects one of the content items. Once the user selects one of the presented content items, a request for access associated with the selected content item can be transmitted to the access decision provider for processing. Instead of having to process the request from scratch, the preliminary access decision can be accessed or retrieved. The preliminary access decision can be used as the basis for a final access decision, which will be a determination of whether the user can access the selected content item. The preemptive processing and use of the preliminary access decision can reduce user wait times between the selection of the content item and the receipt of the final access decision.

Figure 4A:
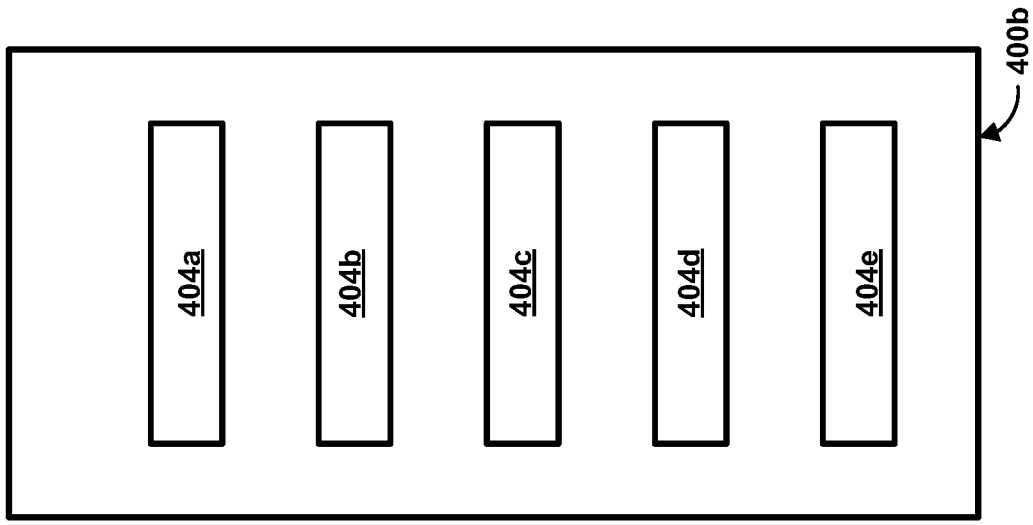
FIG. 4A is a representation of a user interface.
Figure 4A:
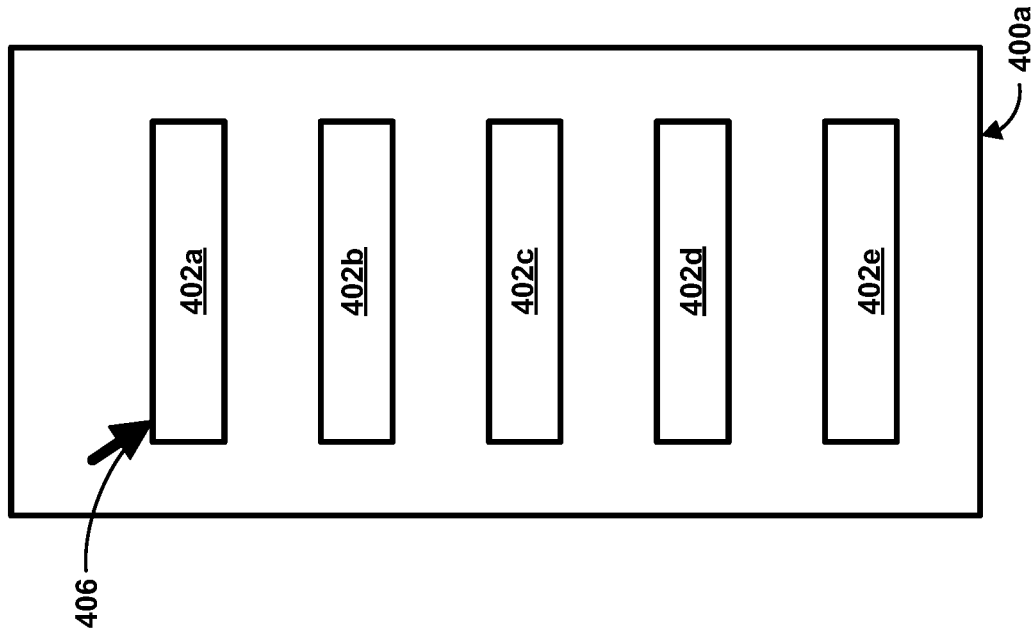

FIG. 4A illustrates a user interface (e.g., interface 106) showing a first bounded portion 400a or region and a second bounded portion 400b or region. In an aspect, the first bounded portion 400a can comprise a plurality of selectable elements 402a, 402b, 402c, 402d, 402e. In an aspect, the second bounded portion can comprise a plurality of selectable elements 404a, 404b, 404c, 404d, 404e. In a further aspect, an indicator 406 can be positioned adjacent a first selectable element 402a within the first bounded portion 400a. Accordingly, information relating to the selectable elements 402a, 402b, 402c, 402d, 402e in the first bounded portion 400a can be transmitted to the license issuance service (e.g., computing device, license element, etc.). This allows the license issuance service to make preemptive data retrievals of user information (e.g., billing status, package-channel assignment) as well as media metadata (e.g., available dates, etc.) and to make preliminary decisions on that data which can then be placed in caches on the service side waiting for the "final" selection to be made.

Figure 4B:
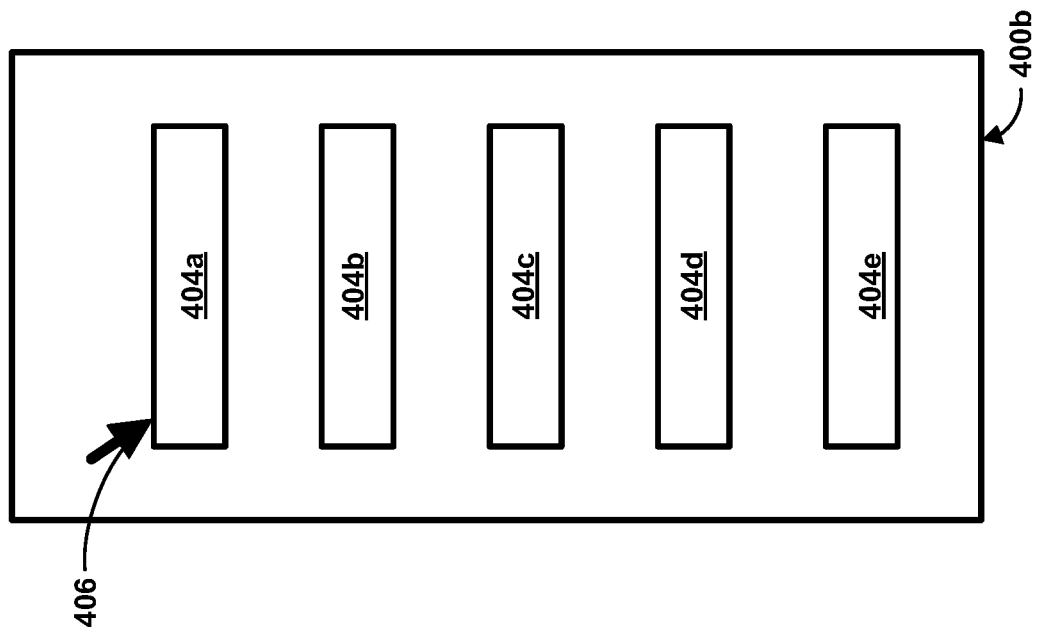
FIG. 4B is a representation of a user interface.
Figure 4B:
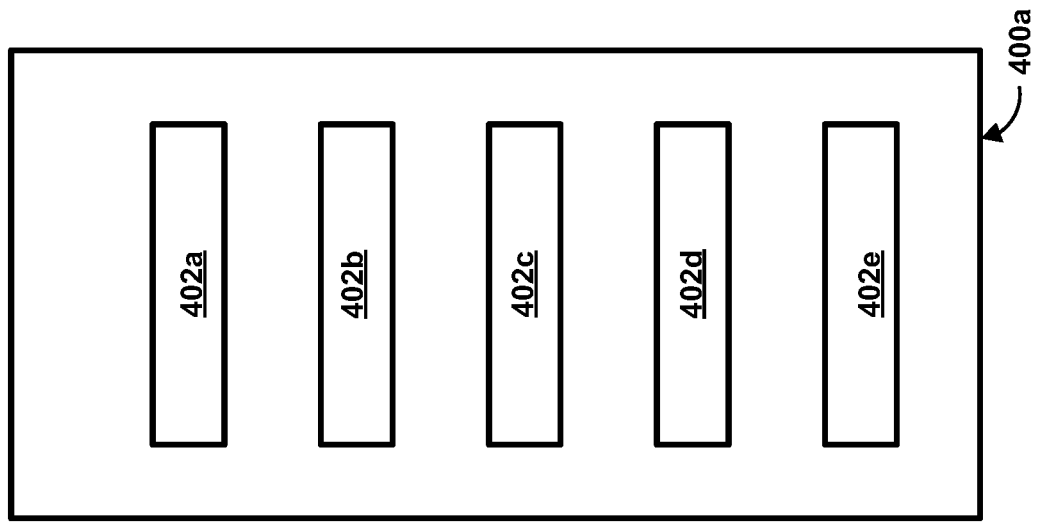

As illustrated in FIG. 4B, the indicator 406 can be positioned (e.g., moved into a position) adjacent a first selectable element 404a within the second bounded portion 400b. Accordingly, information relating to the selectable elements 404a, 404b, 404c, 404d, 404e in the second bounded portion 400b can be transmitted to the license issuance service (e.g., computing device, license element, etc.). This allows the license issuance service to make preemptive data retrievals of user information (billing status, package-channel assignment) as well as media meta data (available dates, etc.) and to make preliminary decisions on that data then which can then be placed in caches on the service side waiting for the "final" selection to be made.

Figure 5:
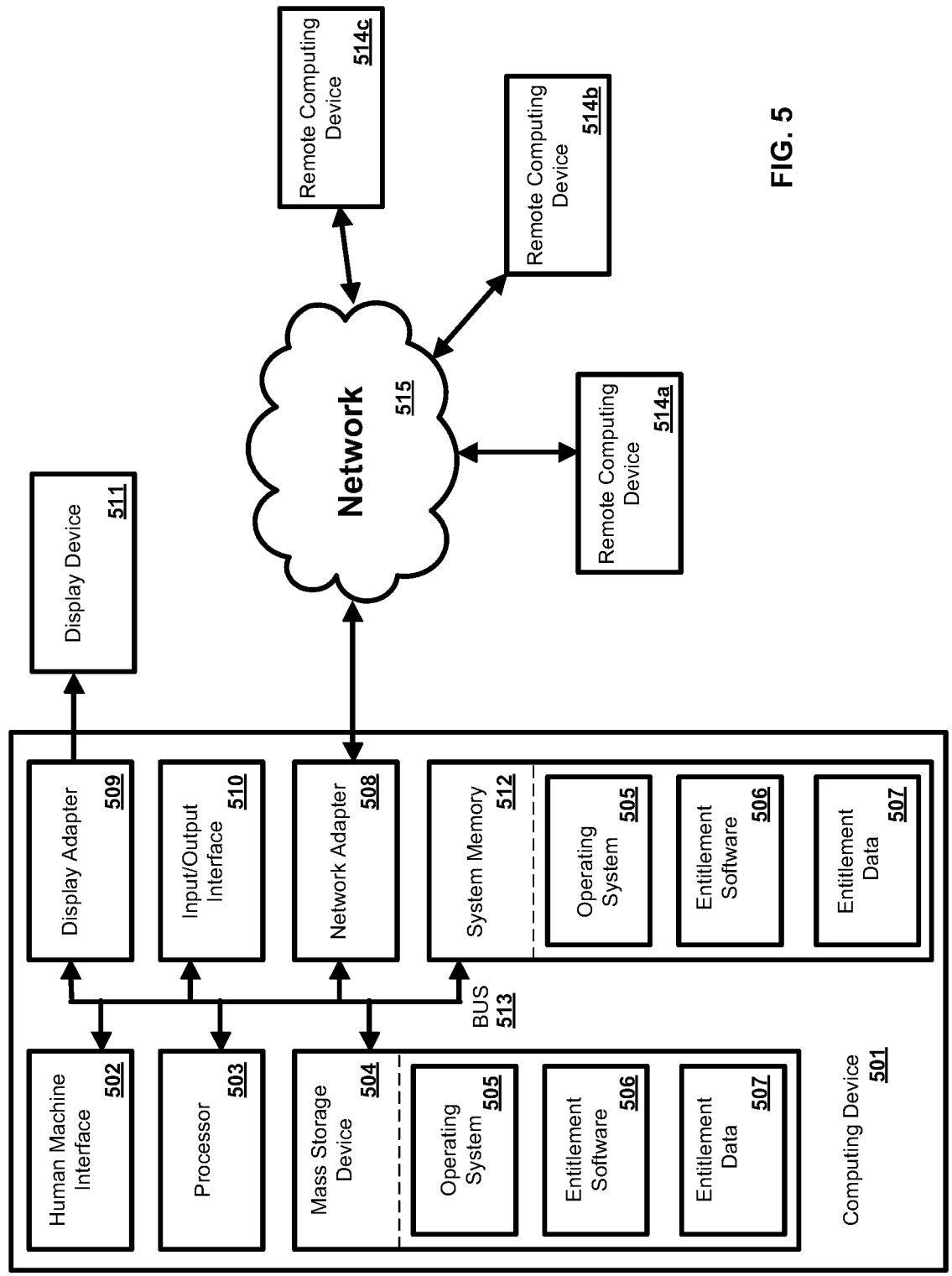
FIG. 5 is a block diagram of an exemplary computing system and network.

In an exemplary aspect, the methods and systems can be implemented on a network and a computing system, such as computing device 501 as illustrated in FIG. 5 and described below. By way of example, one or more of the user device 102 and the computing device 104 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 501. The components of the computing device 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, entitlement software 506, entitlement data 507, a network adapter 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computing device 501 typically comprises a variety of computer readable media. Exemplary readable media can be any available media that is accessible by the computing device 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data, such as entitlement data 507, and/or program modules, such as operating system 505 and entitlement software 506, that are immediately accessible to and/or are presently operated on by the processing unit 503.

In another aspect, the computing device 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computing device 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and entitlement software 506. Each of the operating system 505 and entitlement software 506 (or some combination thereof) can comprise elements of the programming and the entitlement software 506. Entitlement data 507 can also be stored on the mass storage device 504. Entitlement data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 501 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computing device 501 can have more than one display adapter 509 and the computer 501 can have more than one display device 511. For example, a display device can be a monitor, an LCD (Liquid Crystal Display), or a projector. In addition to the display device 511, other output peripheral devices can comprise components, such as speakers (not shown) and a printer (not shown), that can be connected to the computing device 501 via Input/Output Interface 510. Any step and/or result of the methods can be output in any form to an output device. Such output can be any form of visual representation, including, but not limited to, textual, graphical, animation, audio, tactile, and the like. The display 511 and computing device 501 can be part of one device, or separate devices.

The computing device 501 can operate in a networked environment using logical connections to one or more remote computing devices 514*a,b,c*. By way of example, a remote computing device can be a personal computer, portable computer, a smart phone, a server, a router, a network computer, a peer device or other common network node, and so on. Logical connections between the computing device 501 and a remote computing device 514*a,b,c* can be made via a network 515, such as a local area network (LAN) and a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of entitlement software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

Figure 6:
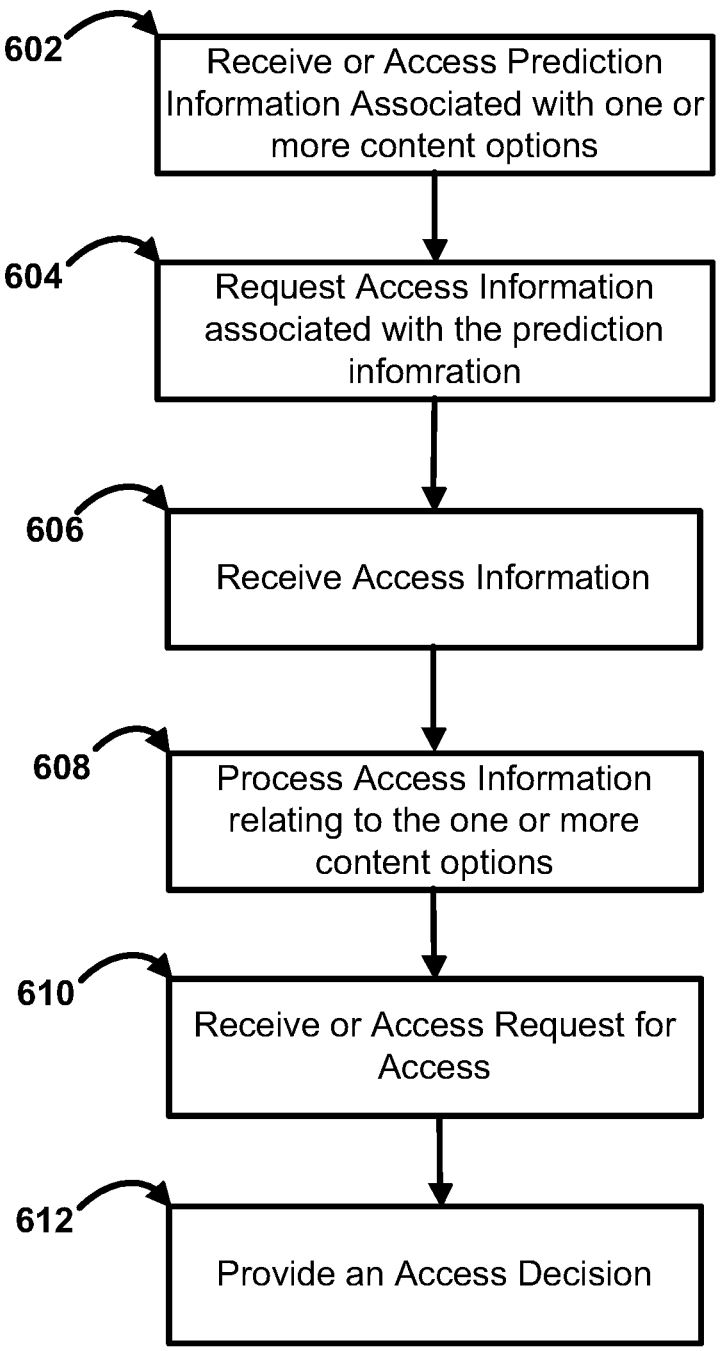
FIG. 6 is a flow chart of an exemplary method.

In an aspect, illustrated in FIG. 6, provided are methods for managing data. In step 602, prediction information can be received or accessed. In an aspect, the prediction information can relate to one or more content options, such as selectable content options associated with one or more content items. As an example, the prediction information can comprise identifiers associated with the one or more content options. As another example, the one or more content options can comprise selectable content options that are likely candidates for user selection.

In step 604, access information can be requested. In an aspect, the access information can be associated with the prediction information. In another aspect, the prediction information and the request for access can be received from the same device.

In step 606, access information can be received in response to the request for access information. In an aspect, the access information can comprise one or more of: account information, user metadata (e.g., billing status, subscriptions, billing location, third-party partner information, SSO identifiers, etc.), media metadata (e.g., MPAA-Ratings, protection scheme, expiration date, available date, subscription package relationships, etc.), purchased rentals of media title(s) in question, single purchased ownership of media title(s) in question, purchased season ownership (e.g., all episodes of a content series or season), subscription package definitions related to the user's subscriptions (e.g., pay services, specialized services), evaluations of subscription package definitions against media metadata (e.g., does the users subscription definition evaluate positive or negative to the requested data option), locations of dependent services for this user/media account (e.g., media data service, device data service, secure key data service, subscription data service, etc.), security keys necessary to issue relevant DRM license, device details (e.g., security keys for specific hardware, DRM-individualization keys, limits on device count active), local blackout information (e.g., sports games blacked out for current location), and external third party metadata for media. In another aspect, the access information can be encrypted.

In step 608, at least a portion of the received access information can be processed to provide a preliminary access decision. In an aspect, processing at least a portion of the access information can comprise pre-determining at least a portion of the access information into storage. As an example, information relating to one or more of the following fields can be processed (e.g., pre-loaded, pre-determined): business account identifier (Id), first name, last name, birthdate, gender, username, display name, region code (identifier), postal code, country code, country name, region name, custom UserKeyValuePairs, current mobile location, current location. Other fields and information can be processed. In an aspect, certain fields, such as business account Id, can be used to evaluate access in gross terms. For instance, a customer may not have access to any content related to or offered by a first provider, in which case the evaluation of access could be determined and provided to the user or associated device without the user selecting the media for viewing. As another example, fields such as postal code or current location can influence access to sports events or blackout dates by region or influence access to services that might prevent viewing (e.g., VOD viewing only if the users current location is within 100 miles of the field postal code).

In step 610, a request for access relating to the one or more content options can be received. In an aspect, the request for access can comprise a selection of the one or more content items. In step 612, an access decision can be provided. In an aspect, the access decision can be based at least in part on the preliminary access decision. In an aspect, if preliminary access decision indicates that a user has no access right or entitlement to a specific content item, then a user cannot submit a request for the specific content item. For example, a button identifying the specific content item can be rendered unexecutable (e.g., "grayed out").

Figure 7:
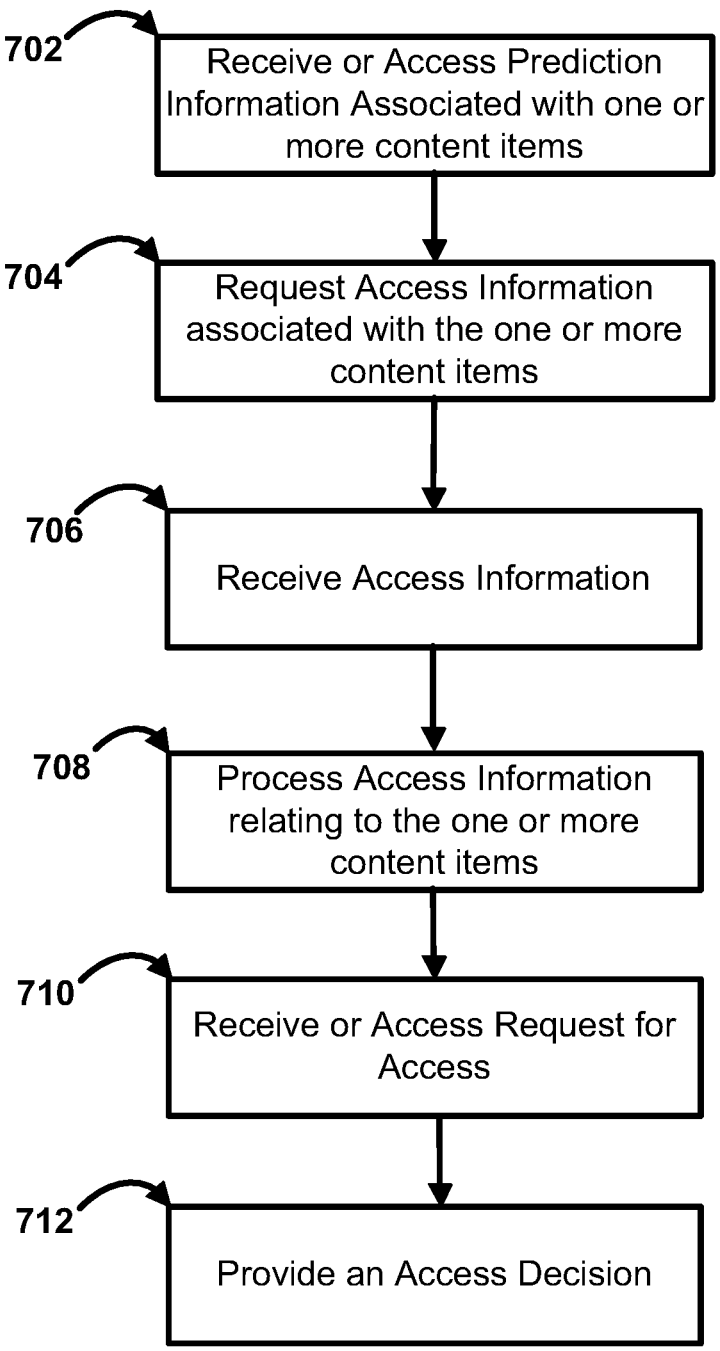
FIG. 7 is a flow chart of an exemplary method.

In an aspect, illustrated in FIG. 7, provided are methods for managing data. In step 702, prediction information can be received or accessed. In an aspect, the prediction information can relate to one or more content items. As an example, the one or more content items can comprise movies, television series, programs, and the like that are likely candidates for user selection. As an example, the prediction information can relate to a prediction of what the user could possibly select. In an aspect, the prediction can be based on viewing history associated with the one or more content items. For example, the viewing history can comprise viewing time and/or frequency associated with the one or more content items.

In step 704, access information associated with the one or more content items can be requested. In an aspect, the access information can be associated with the prediction information relating to the one or more content items. In another aspect, the prediction information and the request for access can be received from the same device. In an aspect, the access information can comprise one or more of: account information, user metadata (e.g., billing status, subscriptions, billing location, third-party partner information, SSO identifiers, etc.), media metadata (e.g., MPAA-Ratings, protection scheme, expiration date, available date, subscription package relationships, etc.), purchased rentals of media title(s) in question, single purchased ownership of media title(s) in question, purchased season ownership (e.g., all episodes of a content series or season), subscription package definitions related to the user's subscriptions (e.g., pay services, specialized services), evaluations of subscription package definitions against media metadata (e.g., does the users subscription definition evaluate positive or negative to the requested data option), locations of dependent services for this user/media account (e.g., media data service, device data service, secure key data service, subscription data service, etc.), security keys necessary to issue relevant DRM license, device details (e.g., security keys for specific hardware, DRM-individualization keys, limits on device count active), local blackout information (e.g., sports games blacked out for current location), and external third party metadata for media. In another aspect, the access information can be encrypted.

In step 706, access information can be received in response to the request for access information. In an aspect, the access information can be received from a cached storage medium or a remote storage device.

In step 708, at least a portion of the received access information can be processed to provide a preliminary access decision. In an aspect, processing at least a portion of the access information can comprise pre-determining at least a portion of the access information into storage. As an example, information relating to one or more of the following fields can be processed (e.g., pre-loaded, pre-determined): business account identifier (Id), first name, last name, birthdate, gender, username, display name, region code (identifier), postal code, country code, country name, region name, custom UserKeyValuePairs, current mobile location, current location. Other fields and information can be processed. In an aspect, certain fields, such as business account Id, can be used to evaluate access in gross terms. For instance, a customer may not have access to any content related to or offered by a first provider, in which case the evaluation of access could be determined and provided to the user or associated device without the user selecting the media for viewing. As another example, fields such as postal code or current location can influence access to sports events or blackout dates by region or influence access to services that might prevent viewing (e.g., VOD viewing only if the users current location is within 100 miles of the field postal code).

In step 710, a request for access relating to the one or more content items can be received. In an aspect, the request for access can comprise a selection of the one or more content items. In step 712, an access decision can be provided. In an aspect, the access decision can be based at least in part on the preliminary access decision. In an aspect, if preliminary access decision indicates that a user has no access right or entitlement to a specific content item, then a user cannot submit a request for the specific content item. For example, a button identifying the specific content item can be rendered unexecutable (e.g., "grayed out").

Figure 8:
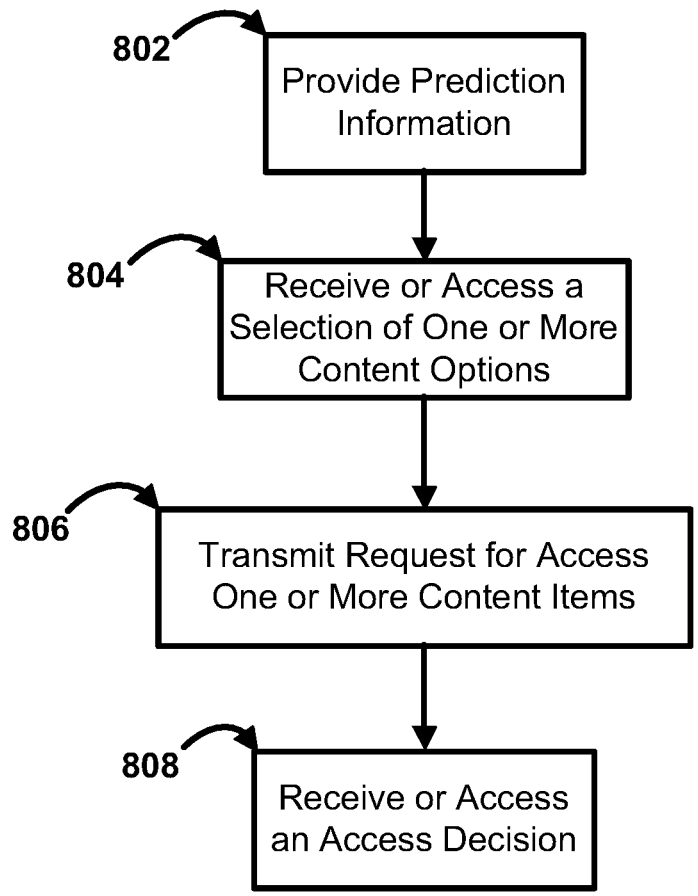
FIG. 8 is a flow chart of an exemplary method.

FIG. 8 illustrates an exemplary method for managing data. In step 802, prediction information can be provided. In an aspect, the prediction information can relate to a plurality of content options presented to a user. As an example, one or more of the plurality of content options can relate to one or more content items. As a further example, the prediction information can comprise information relating to likely candidates of the plurality of content options for user selection. In another aspect, the prediction information facilitates pre-determining at least a portion of access information. In an aspect, the prediction information can relate to a prediction of what the user could possibly select. As an example, the prediction information can comprise identifiers associated with one or more of the plurality of content options. For example, prediction information related to a content item can be provided when the user hovers over, or highlight the content item before actually selecting the content item. In an aspect, the prediction information can be based on viewing history associated with a user and/or a user device. For example, the user viewing history can comprise types of frequently viewed content items and associated viewing time. In another aspect, the prediction information can be based on account information such as location, language preference, gender, language preference, and the like, associated with the user. In an aspect, prediction information can be used for preemptive processing. Such preemptive processing can be used to generate a preliminary access decision for one or more of the content items presented to the user and, in some aspects, before the user actually selects one of the content items. The preemptive processing and use of the preliminary access decision can reduce user wait times between the selection of the content item and the receipt of the final access decision.

In step 804, a selection of one or more content options of the plurality of content options can be received. In an aspect, the selection can be made by the user via an input interface of a user device associated with the user. As an example, the input interface can comprise a button, a joystick, a keyboard, a pointing device (e.g., "mouse"), a microphone, a remote control, and the like. As another example, one or more content options can be selected by clicking (e.g., single clicking, double clicking, long clicking) on the intended content items.

In step 806, a request for access to one or more content items can be transmitted. For example, the request for access one or more content items can be transmitted from the user device 102 to the computing device 104. In an aspect, once the user selects one or more of the presented content items on the user device 102, a request for access associated with the selected one or more content items can be transmitted to an access decision provider for processing. Instead of having to process the request from scratch, the preliminary access decision can be accessed or retrieved. The preliminary access decision can be used as the basis for a final access decision, which will be a determination of whether the user can access the selected content item.

In step 808, an access decision can be received. In an aspect, the access decision can be received in response to the request for access one or more content items. In another aspect, the access decision can be based at least in part on at least a portion of the access information. The access information can be associated with the prediction information. As an example, the access information can comprise one or more of: account information, user metadata (e.g., billing status, subscriptions, billing location, third-party partner information, SSO identifiers, etc.), media metadata (e.g., MPAA-Ratings, protection scheme, expiration date, available date, subscription package relationships, etc.), purchased rentals of media title(s) in question, single purchased ownership of media title(s) in question, purchased season ownership (e.g., all episodes of a content series or season), subscription package definitions related to the user's subscriptions (e.g., pay services, specialized services), evaluations of subscription package definitions against media metadata (e.g., does the users subscription definition evaluate positive or negative to the requested data option), locations of dependent services for this user/media account (e.g., media data service, device data service, securekey data service, subscription data service, etc.), security keys necessary to issue relevant DRM license, device details (e.g., security keys for specific hardware, DRM-individualization keys, limits on device count active), local blackout information (e.g., sports games blacked out for current location), and external third party metadata for media. As such, instead of having to process the request from scratch, the preliminary access decision based on the prediction information and the access information can be used as the basis for a final access decision, which will be a determination of whether the user can access the selected content item.

Figure 9:
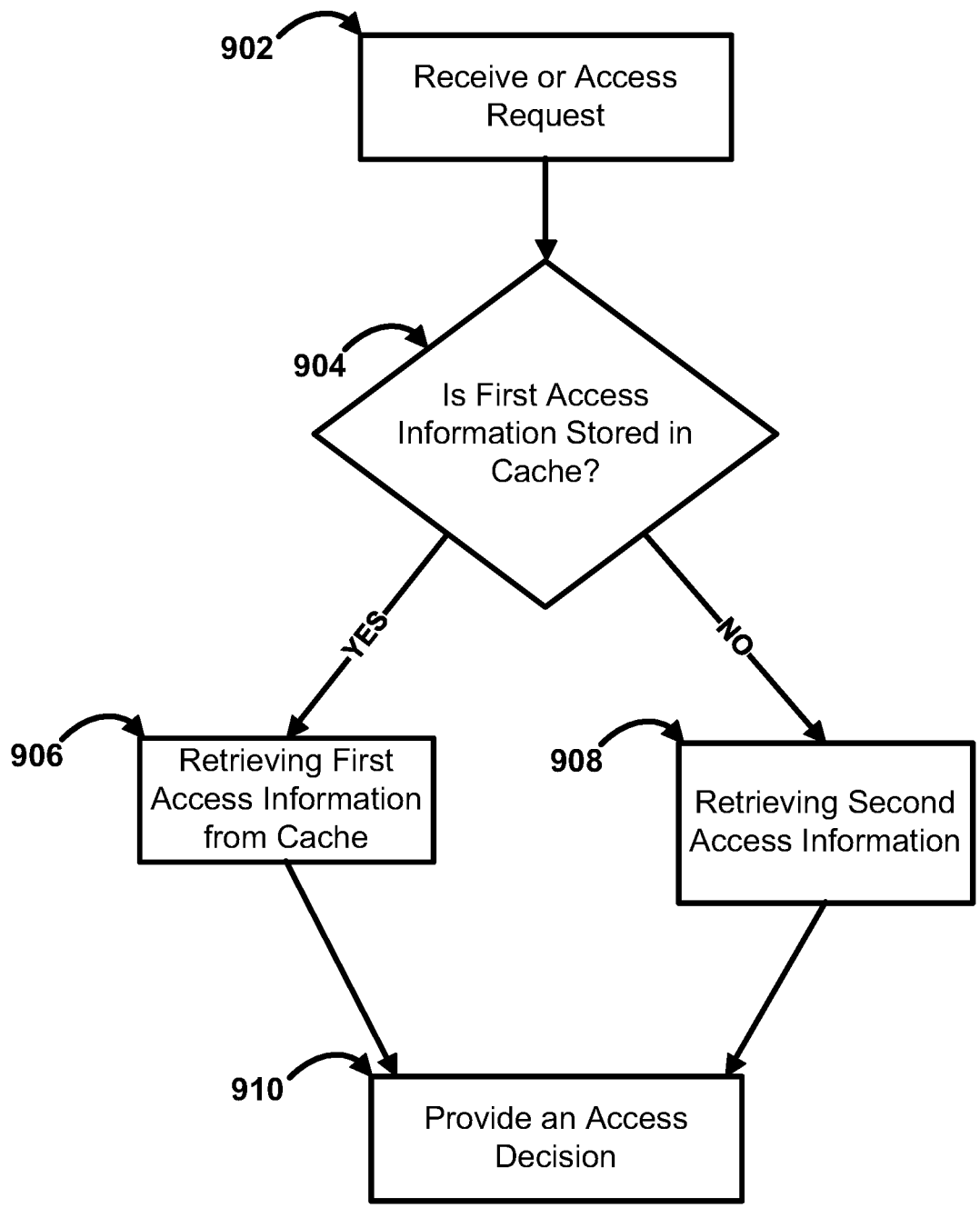
FIG. 9 is a flow chart of an exemplary method.

FIG. 9 illustrates an exemplary method for managing data. In step 902, a request for access to content can be received. In an aspect, the request for access can comprise a selection of the one or more content options. In another aspect, the request for access can comprise a location identifier for the content.

In step 904, a determination can be made whether first access information is stored in a cached storage medium. In step 906, if the first access information is stored in the cached storage medium, the first access information can be accessed and/or retrieved from the cached storage medium. In step 908, if the first access information is not stored in the cached storage medium, second access information can be accessed or retrieved from a remote storage device. In an aspect, the remote storage device is disposed remotely relative to the cached storage device. In another aspect, the access information can comprise one or more of: account information, user metadata (e.g., billing status, subscriptions, billing location, third-party partner information, SSO identifiers, etc.), media metadata (e.g., MPAA-Ratings, protection scheme, expiration date, available date, subscription package relationships, etc.), purchased rentals of media title(s) in question, single purchased ownership of media title(s) in question, purchased season ownership (e.g., all episodes of a content series or season), subscription package definitions related to the user's subscriptions (e.g., pay services, specialized services), evaluations of subscription package definitions against media metadata (e.g., does the users subscription definition evaluate positive or negative to the requested data option), locations of dependent services for this user/media account (e.g., media data service, device data service, securekey data service, subscription data service, etc.), security keys necessary to issue relevant DRM license, device details (e.g., security keys for specific hardware, DRM-individualization keys, limits on device count active), local blackout information (e.g., sports games blacked out for current location), and external third party metadata for media.

In step 910, an access decision based on one or more of the first access information and the second access information can be provided. In an aspect, one or more of the first access information and the second access information can be encrypted.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A system comprising:
a user device configured to send a request for access to a video content item of one or more video content items; and
a computing device configured to:
receive information that indicates the one or more video content items are predicted for selection by a user;
determine, based on the information, one or more access decisions corresponding to the one or more video content items; and
determine, based on the request and based on an access decision of the one or more access decisions corresponding to the video content item, a subsequent access decision.

2. The system of claim 1, wherein the computing device is configured to receive the information based on the user device presenting via a user interface a selectable element associated with the one or more video content items.

3. The system of claim 1, wherein the information comprises prediction information associated with at least one of: access information, user information, a billing status, a package-channel assignment, media metadata, availability date information, or a subscription policy.

4. The system of claim 3, wherein the prediction information comprises information indicative of at least one video content item of a plurality of video content items likely to be selected by the user.

5. The system of claim 1, wherein the one or more video content items are predicted for selection by the user based on at least one of: user viewing history, device viewing history, or household viewing history.

6. The system of claim 1, wherein the computing device is configured to determine the one or more access decisions based on comparing a type of service level to a type of video content item.

7. The system of claim 1, wherein the computing device is configured to determine the subsequent access decision based on a rights package associated with the user, wherein the rights package comprises at least one of: rights data, subject policies, or distribution rights.

8. The system of claim 1, wherein the computing device is further configured to determine entitlements corresponding to a rights package associated with the user.

9. The system of claim 1, wherein the computing device is further configured to store, in a cache, the one or more access decisions.

10. A system comprising:
a user device configured to send a request for access to a video content item of one or more video content items; and
a computing device configured to:
determine, based on prediction information associated with a plurality of video content items, the one or more video content items, wherein the one or more video content items are predicted for selection by a user;
determine, based on information associated with the one or more video content items, one or more access decisions corresponding to the one or more video content items;
receive the request for access to the video content item from the user device; and
determine, based on an access decision of the one or more access decisions corresponding to the video content item, a subsequent access decision.

11. The system of claim 10, wherein the computing device is configured to determine the one or more video content items based on at least one of: user viewing history, device viewing history, or household viewing history.

12. The system of claim 10, wherein the prediction information comprises information indicative of at least one video content item of a plurality of video content items likely to be selected by the user.

13. The system of claim 10, wherein the information comprises at least one of: access information, user information, a billing status, a package-channel assignment, media metadata, availability date information, or a subscription policy.

14. The system of claim 10, wherein the computing device is configured to receive the request for access to the video content item based on a selection by the user of the video content item.

15. The system of claim 10, wherein the computing device is configured to determine the subsequent access decision based on a rights package associated with the user, wherein the rights package comprises at least one of: rights data, subject policies, or distribution rights.

16. The system of claim 10, wherein the computing device is further configured to store, in a cache, the one or more access decisions.

17. One or more non-transitory computer-readable media storing processor-executable instructions that, when executed by at least one processor, cause the at least one processor to:
receive information that indicates one or more video content items are predicted for selection by a user;
determine, based on the information, one or more access decisions corresponding to the one or more video content items; and
determine, based on a request for access to a video content item of the one or more video content items and based on an access decision of the one or more access decisions corresponding to the video content item, a subsequent access decision.

18. The one or more non-transitory computer-readable media of claim 17, wherein the processor-executable instructions, when executed by the at least one processor, further cause the at least one processor to receive the information based on presenting via a user interface a selectable element associated with the one or more video content items.

19. The one or more non-transitory computer-readable media of claim 17, wherein the information comprises prediction information associated with at least one of: access information, user information, a billing status, a package-channel assignment, media metadata, availability date information, or a subscription policy.

20. The one or more non-transitory computer-readable media of claim 19, wherein the prediction information comprises information indicative of at least one video content item of a plurality of video content items likely to be selected by the user.

21. The one or more non-transitory computer-readable media of claim 17, wherein the one or more video content items are predicted for selection by the user based on at least one of: user viewing history, device viewing history, or household viewing history.

22. The one or more non-transitory computer-readable media of claim 17, wherein the processor-executable instructions, when executed by the at least one processor, further to cause the at least one processor to determine the one or more access decisions based on comparing a type of service level to a type of video content item.

23. The one or more non-transitory computer-readable media of claim 17, wherein the processor-executable instructions, when executed by the at least one processor, further cause the at least one processor to determine the subsequent access decision based on a rights package associated with the user, wherein the rights package comprises at least one of: rights data, subject policies, or distribution rights.

24. The one or more non-transitory computer-readable media of claim 17, wherein the processor-executable instructions, when executed by the at least one processor, further cause the at least one processor to determine entitlements corresponding to a rights package associated with the user.

25. The one or more non-transitory computer-readable media of claim 17, wherein the processor-executable instructions, when executed by the at least one processor, further cause the at least one processor to store, in a cache, the one or more access decisions.

26. One or more non-transitory computer-readable media storing processor-executable instructions that, when executed by at least one processor, cause the at least one processor to:
determine, based on prediction information associated with a plurality of video content items, one or more video content items of the plurality of video content items, wherein the one or more video content items are predicted for selection by a user;
determine, based on information associated with the one or more video content items, one or more access decisions corresponding to the one or more video content items;
receive a request for access to a video content item of the one or more video content items; and determine, based on an access decision of the one or more access decisions corresponding to the video content item, a subsequent access decision.

27. The one or more non-transitory computer-readable media of claim 26, wherein the processor-executable instructions, when executed by the at least one processor, further cause the at least one processor to determine the one or more video content items based on at least one of: user viewing history, device viewing history, or household viewing history.

28. The one or more non-transitory computer-readable media of claim 26, wherein the prediction information comprises information indicative of at least one video content item of a plurality of video content items likely to be selected by the user.

29. The one or more non-transitory computer-readable media of claim 26, wherein the information comprises at least one of: access information, user information, a billing status, a package-channel assignment, media metadata, availability date information, or a subscription policy.

30. The one or more non-transitory computer-readable media of claim 26, wherein the processor-executable instructions, when executed by the at least one processor, further cause the at least one processor to receive the request for access to the video content item based on a selection by the user of the video content.

31. The one or more non-transitory computer-readable media of claim 26, wherein the processor-executable instructions, when executed by the at least one processor, further cause the at least one processor to determine the subsequent access decision based on a rights package associated with the user, wherein the rights package comprises at least one of: rights data, subject policies, or distribution rights.

32. The one or more non-transitory computer-readable media of claim 26, wherein the one or more non-transitory computer-readable media storing processor-executable instructions, when executed by the at least one processor, further cause the at least one processor to store, in a cache, the one or more access decisions.

* * * * *